United States Patent [19]

Bergevin

[11] Patent Number: 4,981,546

[45] Date of Patent: Jan. 1, 1991

[54] HEAT-SEALING DEVICE FOR THERMOPLASTIC FILMS

[75] Inventor: Kevin Bergevin, 146 Falkirk Terrace, Kingston, Canada, K7L 5A5

[73] Assignee: Kevin Bergevin, Kingston, Canada

[21] Appl. No.: 405,590

[22] Filed: Sep. 8, 1989

[30] Foreign Application Priority Data

Dec. 14, 1988 [GB] United Kingdom ............... 8829196

[51] Int. Cl.⁵ ...................... B29C 65/22; B29C 65/38
[52] U.S. Cl. ................... 156/515; 156/583.2; 493/194; 493/203
[58] Field of Search ............... 156/583.2, 515, 251; 493/189, 203, 194

[56] References Cited

U.S. PATENT DOCUMENTS

| 3,015,601 | 1/1962 | Fener | 156/583.2 |
| 3,692,613 | 9/1972 | Pederson | 156/498 |
| 3,982,991 | 9/1976 | Hamm et al. | 156/515 |

FOREIGN PATENT DOCUMENTS

| 3433096 | 3/1986 | Fed. Rep. of Germany. |
| 57-43826 | 3/1982 | Japan. |

Primary Examiner—Michael Wityshyn

[57] ABSTRACT

A heat sealing apparatus includes a pair of sealing jaws and means for closing the jaws, the first of said jaws having an electrical impulse sealing element mounted thereon, covered with a release sheet, and the second of said jaws having a resilient pad mounted thereon, covered with a release sheet, wherein a heat dispersing foil is between the resilient pad and the release sheet which covers the pad.

4 Claims, 1 Drawing Sheet

HEAT-SEALING DEVICE FOR THERMOPLASTIC FILMS

The invention relates to a heat sealing device useful for making pouches filled with flowable materials, e.g. liquids, particularly to pouches made on so-called vertical form and fill machines.

It is well known to package flowable materials, for example, milk, on so-called vertical form and fill machines. Using such a machine, a flat web of synthetic thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After making the transverse seal, but before the jaws of the sealing device are opened, a quantity of material to be packaged, e.g. liquid, is caused to enter the tube, at the filling station, and fill the tube upwardly from the aforementioned transverse seal. The tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device seals and severs the tube transversely at the second transverse section. The material-filled portion of the tube is now in the form of a pillow shaped pouch. Thus the sealing device has sealed the top of the filled pouch, and sealed the bottom of the next-to-be formed pouch, all in one operation. One such vertical form and fill machine of the type described above is sold under the trade mark PREPAC. With some other machines, the sealing device does not sever the tube at the second transverse section, but does sever the tube subsequently.

For many years, milk has been packaged in pouches made on vertical form and fill machines. Such pouches have been sold to household consumers and, in use, such milk-filled pouches are stood within an open-mouthed pitcher. More recently, such pouches have been used to package other flowable comestibles, mayonnaise, salad dressings, preserves and the like. Pouches containing such comestibles are usually sold to "institutional" buyers, e.g. restaurants.

A sealing device commonly used is a so-called "impulse sealer" in which an electrical current flows through the sealing element for only a fraction of the cycle time between operations. The impulse sealer may be a round wire, e.g. a "piano" wire about 2.16 mm to 2.29 mm diameter, electrically insulated from a water-cooled supporting jaw. After the electrical impulse is fed to the impulse sealer, there is a cooling period in which the seals partially solidify before the sealing jaws are opened and the bottom seal supports the weight of the flowable material in the pouch. Round wire impulse sealers as described above are satisfactory for form and fill machines when packaging liquids such as milk, water or other highly aqueous products. These liquids have relatively high thermal conductivities and thus aid in cooling of the seal after the sealing jaws are opened, i.e. the cooling effect of the liquid on the seal operates before the weight of the liquid can weaken or rupture the bottom seal. Such round wire impulse sealers are unsatisfactory on form and fill machines when packaging flowable materials such as mayonnaise, dressings, jams and the like. Other kinds of sealers are known, e.g. as disclosed in U.S. Pat. No. 3,692,613, which issued Sept. 19, 1972 to R. E. Pederson. It is common practice to cover the heat seal element with a glass fibre tape which is impregnated with a non-stick material, e.g. polytetrafluoroethylene, and to use similar tape on the jaw upon which the heat sealing element comes into contact during the heat sealing process. The function of such tape is to minimize the possibility of molten or semi-molten polymer from sticking to the heat sealing element or the jaw. It is necessary, from time to time to place fresh pieces of tape over the jaw and heat sealing element because of the thermal degradation which results from repeated operation of the heat sealing device. This problem is particularly accentuated when laminates are used for the pouch material, because of the high temperatures required for thermally severing such material. The present invention is directed to alleviating this problem.

Accordingly, the present invention provides an apparatus for sealing and simultaneously cutting through at least two layers of thermoplastic film, which apparatus includes a pair of sealing jaws and means for closing the jaws, the first of said jaws having an electrical impulse sealing element mounted thereon, said heat sealing element being covered with a release sheet, the second of said jaws having a resilient pad mounted thereon, said resilient pad being covered with a release sheet, the improvement wherein there is a heat dispersing foil between the resilient pad and the release sheet which covers said pad.

In a preferred embodiment the heat dispersing foil is made of nickel or a nickel alloy.

In a further embodiment the release sheets are made from woven glass fibre tape impregnated with polytetrafluoroethylene.

An embodiment of the invention is illustrated in the accompanying drawings wherein.

Figure 1:
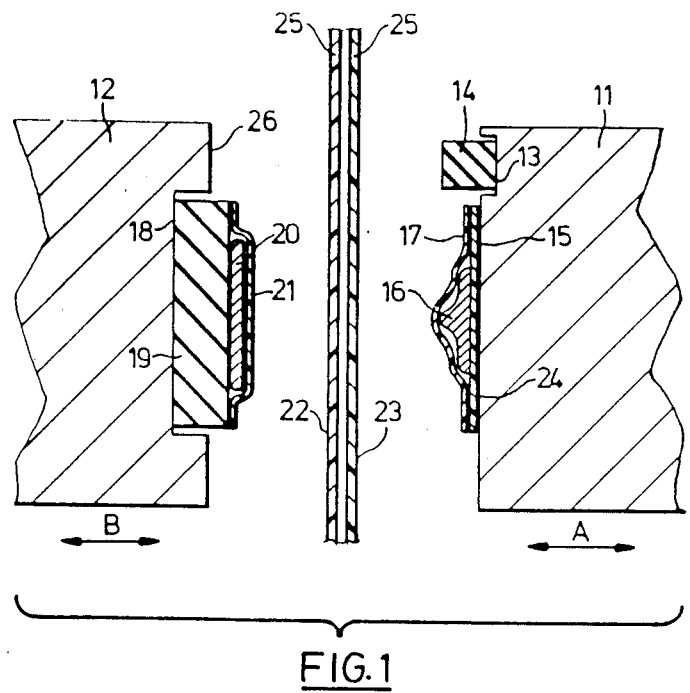
FIG. 1 is a cross-sectional view of an embodiment of the present invention.

FIG. 1 shows a pair of sealing jaws 11 and 12 which are mounted on a form and fill machine (not shown). Both jaws may move in the directions shown by arrows A and B. Jaw 11 has a longitudinal groove 13 therein, in which is situated a clamping rubber 14. On face 24 of jaw 11 is placed a woven glass fibre cloth 15 impregnated with TEFLON (trade mark) polytetrafluoroethylene, which acts as an electrical insulator between the metal of the jaw and heat sealing element 16. Heat sealing element 16 is attached to an electrical impulse providing apparatus (not shown). Heat sealing element 16 is covered by further woven glass fibre cloth 17 impregnated with TEFLON polytetrafluoroethylene. Jaw 12 has a longitudinal channel 18 therein, in which is placed silicone rubber pad 19. Mounted on the face of pad 19 is heat dispersing foil 20, which is covered by woven glass fibre cloth 21 impregnated with TEFLON polytetrafluoroethylene.

During operation, the jaws 11 and 12 start apart, as shown in FIG. 1. Thermoplastic film tube 25 is passed between jaWs 11 and 12. Tube 25 is collapsed transversely as jaws 11 and 12 are caused to approach one another. FIG. 1 shows opposing film surfaces 22 and 23 of tube 25, in cross section, as tube 25 is being collapsed. As jaws 11 and 12 close, tube 25 is clamped between clamping rubber 14 and anvil portion 26 of jaw 12. At the same time film surfaces 22 and 23 are trapped between cloths 17 and 21 by the pressure exerted by heat sealing element !6 on silicone rubber pad 19. An electrical impulse is fed through heat sealing element 16, which heats the heat sealing element 16 sufficiently for the heat to simultaneously heat seal and sever film surfaces 22 and 23. The electrical impulse is then switched off to allow the heat sealing element 16 and the sealed and severed tube to cool sufficiently to "set" the seals. The jaws are then caused to move apart in order to release the film. The seals thus formed are the top seal of a sealed pouch and the bottom seal of the next-to-be-formed pouch. The purpose of cloth 15 is to provide electrical insulation between metal jaw 11 and heat sealing element 16. Cloths 17 and 21 ensure that the film surfaces, during and after the sealing and severing process, do not adhere to any portion of the heat sealing device. The heat dispersing foil 20 significantly reduces the thermal degradation of silicone rubber pad 19 and reduces the thermal degradation of cloths 17 and 21, and increases their useful life. The heat dispersing foil 20 also assists in cooling the seals in the tube, especially when the tube is made from film laminates such as polyethylene film/ethylene-vinyl alcohol copolymer film/polyethylene film, polyethylene film/nylon film/polyethylene film, polyethylene film/metallized polyester film/polyethylene film and the like.

The heat dispersing foil may be made from any malleable and durable metal. Nickel or nickel alloys is preferred for reasons of durability and flexibility. Aluminium is not suitable because it tends to crack rather quickly in service.

It will be understood that the foil of the present invention may be used with a number of other configurations of jaws and heat sealing elements.

The invention is further illustrated by reference to the following examples:

Example 1

Figure 2:
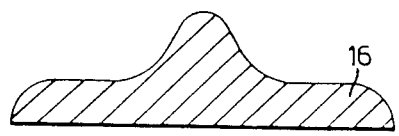
FIG. 2 is a cross-sectional view of a heat sealing element used in Examples I and II herein.

A heat sealing element which comprised a strip having a cross-section as shown in FIG. 2, 2.032 mm wide, 220 mm long, 508 μm thick at its thickest and about 152 μm thick at its thinnest, made from TOPHET A (trade mark) nickel-chrome alloy, was installed on the 220 mm wide front jaw of a PREPAC (trade mark) IS-3 form and fill machine. It was electrically insulated from the jaw with a 19 mm wide adhesive-backed glass fibre woven cloth impregnated with polytetrafluoroethylene. A 220 mm long silicone rubber pad was installed in the back jaw of the machine. Both the rubber pad and the heat sealing element were covered with a 19 mm wide glass fibre woven cloth impregnated with polytetrafluoroethylene.

Pouches, 30 cm long, containing 1800 g water were produced on the machine, using a film laminate comprising 51 μm SCLAIRFILM (trade mark) polyethylene film/25 μm DARTEK (trade mark) nylon film/51 μm SCLAIRFILM polyethylene film. The tube of film produced was about 364 mm in circumference (182 mm layflat). The pouches were produced at rates of 25 pouches per minute. After about 5 minutes of operation, the impregnated cloths were severely burnt and the silicone rubber pad contained burnt grooves. These grooves were most severe at the ends of the rubber pad but extended a few millimeters into the sealing zone. The film tube appeared to act as a "heat sink", so that the zone where the film was in contact with the impregnated cloths were less affected than the zone where there was no contact of film with the impregnated cloths. As the element length must be longer than the width of the film tube, because of a tendency of the film tube to oscillate across the width of the heat sealing device and because of a tendency for the vertical heat seal overlap to change width, thus changing the width of the film tube, the aforementioned grooves tend to deepen and lengthen with time. Such grooves may lead to poor transverse heat sealing of the film tube.

The heat sealing device of this example is not within the scope of the present invention and is included for comparative purposes.

Example 2

The heat sealing device used in Example 1 was modified by the insertion of a nickel foil 12.5 mm wide, 220 mm long and 75 μm thick between the silicone rubber pad and the impregnated cloth. The pouches were produced at rates of 25 pouches per minute. The rate of degradation of the impregnated cloth was reduced, even though they were noticeably blackened after 5 minutes. The silicone rubber pad was completely undamaged, however. This shows the superiority of the heat sealing device of the present invention.

What is claimed is:

1. In an apparatus for simultaneously sealing and cutting through at least two layers of thermoplastic film, which apparatus includes a pair of sealing jaws and means for closing the jaws, the first of said jaws having an electrical impulse sealing element mounted thereon, said heat sealing element being covered with a release sheet, the second of said jaws having a resilient pad mounted thereon, said resilient pad being covered with a release sheet, the improvement comprising a flexible heat dispersing foil between the resilient pad and the release sheet which covers the pad.

2. An apparatus according to claim 1 wherein the heat dispersing foil is made of nickel or nickel alloy.

3. An apparatus according to claim 1 wherein the release sheets are made from woven glass fibre tape impregnated with polytetrafluoroethylene.

4. An apparatus according to claim 2 wherein the release sheets are made from woven glass fibre tape impregnated with polytetrafluoroethylene.

* * * * *